Figure 1:
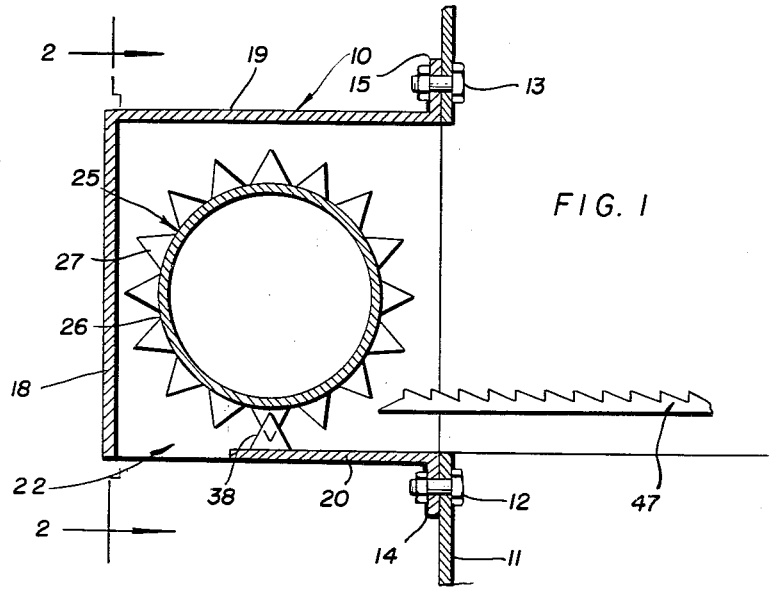

May 15, 1956  P. W. FUELLING  2,745,454
CHOPPING DEVICE FOR HARVESTING MACHINE
Filed June 16, 1951

INVENTOR.
PARNELL W. FUELLING
BY
*Arthur A. Smith*
ATTORNEY

United States Patent Office 2,745,454
Patented May 15, 1956

2,745,454

CHOPPING DEVICE FOR HARVESTING MACHINE

Parnell W. Fuelling, Monroeville, Ind.

Application June 16, 1951, Serial No. 232,016

1 Claim. (Cl. 146—117)

This application relates generally to harvesting machinery, and, more particularly, to weed and straw cutting attachments for such harvesting machines.

Conventional harvesting machines, commonly known as combines when used for harvesting field crops such as grains and soy beans, discharge straw and weeds in substantially the same form as when they are cut. It frequently happens that the straw and weeds are discharged in bunches, whereby the field is either covered with a layer of rather long straw and weeds or is littered with sizable bunches of straw and weeds. Before such a field can be prepared for the next crop, it is usually necessary to remove the layer of straw and the bunches of straw and weeds, whereby a considerable quantity of humus material is lost. This is necessary by reason of the fact that plows and other cultivating instruments will not operate efficiently with the layer of straw on the ground surface.

In order to overcome this problem various types of weed and straw chopping machines have been devised for attachment to combines. However, these prior art devices have been found to be unsatisfactory by reason of the fact that they do not successfully chop and disintegrate all forms of straw and weeds. One type of chopper may be satisfactory for wheat straw but not for oat straw, by reason of the fact that it may become clogged for some unknown reason. Other types of devices operate satisfactorily on the various types of straw, but do not operate to chop and disintegrate the various forms of weeds which ordinarily grow in grain and other crop fields. Unless a chopping device disintegrates all forms of straw and weeds wherever they may be encountered, the chopper is not a successful and economically feasible device by reason of the fact that too much time is wasted in clearing the chopping device.

Accordingly, it is the principal object of this invention to provide a weed and straw chopping mechanism which will satisfactorily disintegrate straw and weeds without becoming inoperative due to clogging.

Another object of this invention to provide a straw and weed chopping device which may economically and conveniently be attached to a conventional combine.

Still another object of this invention is to provide a straw and weed chopping device which may be driven from the mechanism of the conventional combine.

In accordance with this invention there is provided a weed and straw chopping device for attachment to a harvesting machine or combine comprising a box-like casing and a cylindrical and rotatable cutter mounted therein. There is also provided a concave for co-operating with the cutter. The cutter and concave are so related to the box and the straw rack of the harvesting machine that straw and weeds may be fed into the knives by means of air currents and the positive thrusting action of the straw rack.

For the better understanding of the invention, together with other and further objects thereof, reference is made to the following description, taken in connection with the accompanying drawings, and its scope will be pointed out in the appended claim.

Figure 1 of the drawings is a cross sectional view of a weed chopping device as provided in accordance with invention.

Figure 2:
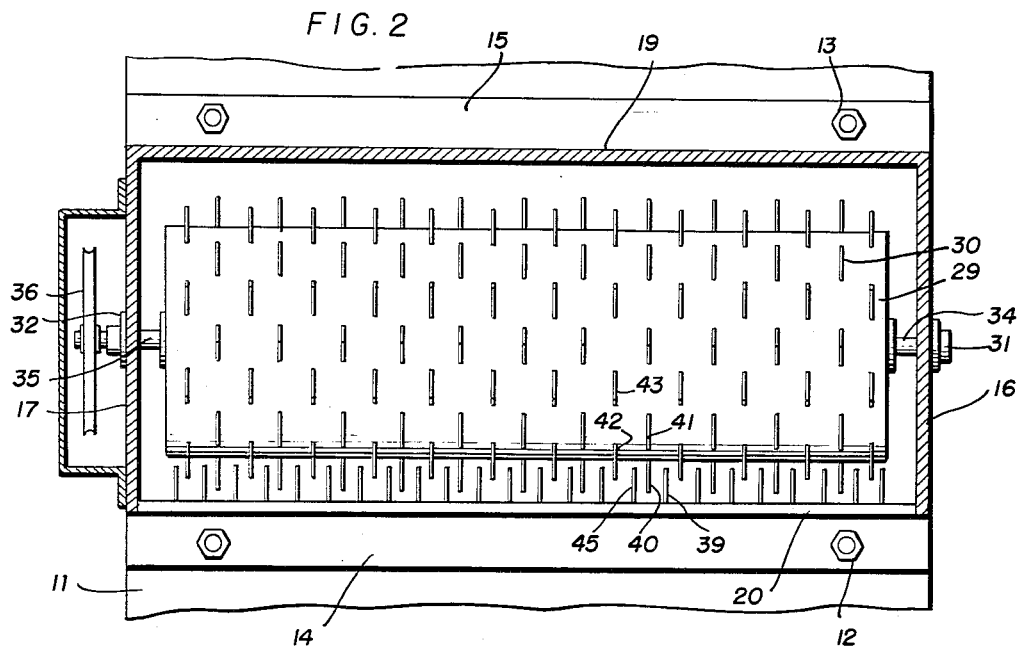

Figure 2 is a section taken on line 2—2 of Figure 1.

In accordance with this invention there is provided a straw chopping device consisting of a casing 10 secured or fixed to the frame of a combine 11 by means of bolts 12 and 13, which pass through the frame 11 into ears 14 and 15 of casing 10. It will be readily understood that any other suiable means of securing casing 10 to the frame 11 will be satisfactory. Casing 10 comprises three side members 16, 17 and 18, which form a substantially rectangular framework. There is provided on top of the box 10 a cover 19 which covers the entire top of the box or frame. The lower side of box 10 comprises a panel or bottom cover 20, which extends from a point adjacent to the frame 11 to a point short of the side 18 whereby there is provided an opening 22 which permits discharge of chopped straw and weeds. This opening has another function which will be described subsequently.

Within the casing 10 there is provided a cylindrical cutter 25 which consists of a drum 26 and a plurality of triangular knives such, as for example, as 27. These knives are similar to the fingers which are customarily provided in mowing machines for cutting field crops and are provided with two sharpened edges which form the sides of the triangle. Knives 27 are arranged in rows, as illustrated in Figure 2. For example, rows 29 and 30 show the knives of each respective row to be staggered relative to one another. The cutter 25 is mounted for rotation in bearings 31 and 32 which are mounted in the side members 16 and 17, respectively. Each end of cutter 25 is provided with a shaft such, for example, as shaft 34 and shaft 35, which may be a continuous shaft from one end of the cutter 25 to the other, or may be separate shafts mounted to the ends of the drum 26. Shaft 35 is provided with a pulley 36, which may be belted to the driving mechanism of the combine 11 in any suitable manner, as will be obvious to those of ordinary skill in the art. Co-operating with the knives of the cutter 25 is a concave 38 which comprises a single row of knives mounted on the bottom cover 20 beneath the center of cutter 25. The knives 39 of concave 38 are spaced more closely together than the knives of the cutter 25 whereby they are arranged to interleave between the knives of successive rows such as rows 29 and 30 on the cutter 25. This is illustrated in Figure 2 where it is shown that the knives 40 and 41 and the knives 42 and 43 pass on either side of the knife 45 of the concave 38.

It has been found by experiment that the cutter 25 necessarily must be mounted so that the knives 27 barely clear the oscillating straw rack 47 of the combine 11. Thus, when straw is conveyed out of the combine on the rack 47 it is conveyed to a point where it actually contacts the knives 27 of cutter 25. Furthermore, if there is any tendency for the straw to stop at this point, the oscillating action of rack 47 tends to force the straw and weeds toward the knives 27 and the concave 38.

It has been found further by experiment that it is necessary that the cover 19 be provided over the top of the cutter 25, as, without such a cover, the device will become clogged by certain types of weeds. It is found further by experiment that the bottom cover 20 must extend only to a point slightly beyond the center of drum 26, approximately as shown in the drawings thereby to leave a discharge opening which will not only permit discharge of the straw, but will also permit the flow of air underneath the cutter 25, and out through the discharge opening 22. Without this flow of air as described, it is found that certain types of weeds and straw will clog the mechanism.

The relationship of the various elements of this device is critical in order to obtain satisfactory operation in all types of weeds and grains. A typical modification of this invention is specified as follows:

The diameter of drum 26 may be ten inches. The distance from the periphery of drum 26 to the side of the combine 11 may be six inches. The distance from the center of the drum to the top 19 may be nine and a half inches. The distance from the periphery of the drum to the bottom member 20 may be four inches. The distance from the periphery of the drum 26 to the frame member 18 may be four inches. The distance from the bottom member 20 to the extreme end of the rack 47 may be two inches. The above dimensions are given as typical of an operative modification of this invention.

It will be understood by those skilled in the art that these dimensions may be increased or decreased to provide a weed chopping device having a greater or less capacity as may be required. Experimental use of this device proves that a top 19 must be provided in order to prevent flow of air out through the top of the frame 18. When this top member is omitted it is found that chopped material flows all the way around the periphery of cylinder 26 and piles up at the right hand side of the cylinder and eventually prevents cutting action by the knives of the cylinder. By providing the top 19 and also by situating the end member 18 close to the knives 27 the air currents flowing upwardly around the cylinder and over the top are reduced to a minimum whereby suction is created within the space over the straw rack which tends to draw the straw and weeds into the knives 27 and the concave 38. Also, since the air cannot travel to any appreciable extent in a clockwise direction upwardly around the cylinder, there is a powerful discharge blast of air out through the discharge opening 22 which carries the chopped material out into the open space where it falls to the ground.

Experimental use shows further that the cylinder 26 must be disposed slightly above and close to the straw rack 47 and rotation of the cylinder 26 must be in a clockwise direction with reference to Figure 1. Experiment shows that, if the concave is above the cylinder and the rotation of the cylinder is counterclockwise with discharge of material over the top of the cylinder, serious clogging occurs which renders the device inoperative. Therefore, gravity must be utilized, together with suction and the plunger action of the straw rack 47 to move the straw and weeds into contact with the knives 27 and with the concave 38. Thus, the combination of gravity and the suction created by the rotating cylinder and knives and the plunger action of the straw rack 47 all combine to force unchopped material into contact with the knives, and chopped material out from between the knives through the discharge opening 22.

From the foregoing description it will be apparent to those skilled in the art that applicant has provided a straw chopping device which is capable of cutting and chopping not only ordinary grain straw but also the stalks of weeds and other crops such, for example, as soy beans. The device is simple and economical to manufacture and efficiently reduces straw, weeds and other material into chopped material which may readily be utilized as humus material.

While there has been described what is at present considered the preferred embodiment of the invention, it will be obvious to those skilled in the art that various changes and modifications may be made therein without departing from the invention, and it is, therefore, aimed in the appended claim to cover all such changes and modifications as fall within the true spirit and scope of the invention.

I claim:

A weed chopping device comprising an oscillating straw discharge rack, a pair of spaced panels fixed adjacent the straw-delivering end of said rack, a rotary cylindrical cutter mounted between said panels with its longitudinal axis parallel to and slightly above the end of said rack whereby straw and weeds may be fed to said cutter by gravity and the thrusting action of said rack, said cutter including longitudinal parallel rows of knives on the outer surface thereof, individual knives of one row being displaced laterally with respect to individual knives of adjacent rows, said knives extending into close straw receiving relation with said rack at the outer limit of oscillation thereof, a flat bottom panel having an opening and mounted between and below said side panels for guiding straw and weeds to said cutter and preventing escape of air between said cutter and the side of said machine, a concave mounted at the outer extremity of said lower panel approximately beneath the center of said cylindrical cutter and comprising a row of perpendicular knives mounted on said bottom panel in overlapping relation with said cutter knives to permit passage of said cutter knives between adjacent concave knives, a vertically disposed end cover fixed adjacent said bottom opening and to the outer ends of said panels in close relation to said cylindrical cutter for minimizing the flow of air in an upward direction with respect to said cylindrical cutter, and a cover mounted on the upper side of said side panels closely adjacent to said cylindrical cutter for preventing the discharge of chopped material from the upper side of said cylindrical cutter and for reducing flow of air over the top of said cutter thereby to create suction on the rack side of said cutter.

References Cited in the file of this patent

UNITED STATES PATENTS

| | | |
|---|---|---|
| 569,856 | Carrey | Oct. 20, 1896 |
| 834,378 | Gans et al. | Oct. 30, 1906 |
| 2,213,906 | Ebersol | Sept. 3, 1940 |
| 2,280,677 | Wagner et al. | Apr. 21, 1942 |
| 2,327,893 | Hobson | Aug. 24, 1943 |
| 2,502,032 | Watson | Mar. 28, 1950 |
| 2,554,669 | Elofson | May 29, 1951 |
| 2,561,069 | Peterson | July 17, 1951 |

FOREIGN PATENTS

| | | |
|---|---|---|
| 455,291 | Germany | Jan. 28, 1928 |